Nov. 23, 1948. R. F. GREBB 2,454,694
AUTOMATIC FLUID CONTROLLED TRANSMISSION
Filed July 9, 1945
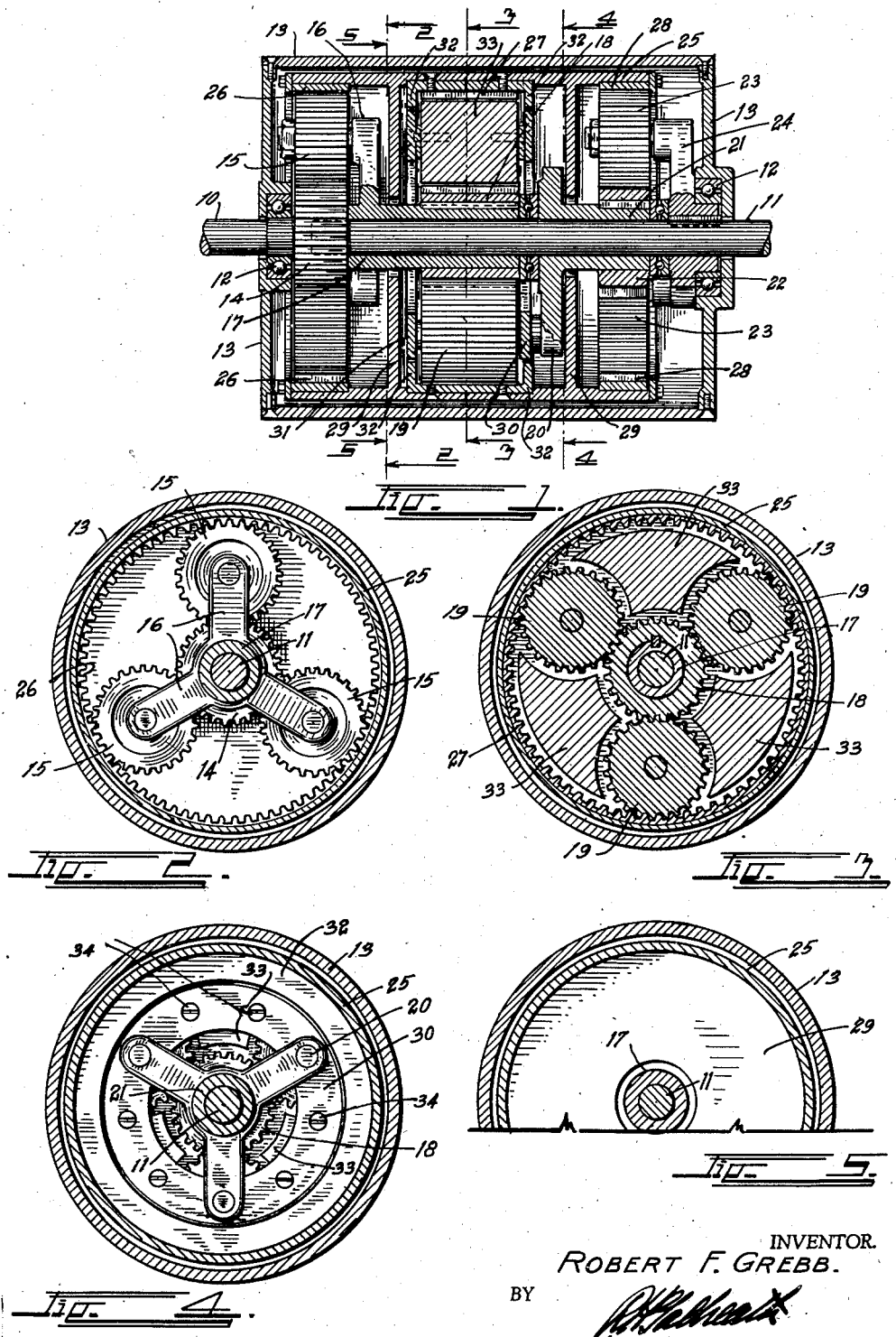
INVENTOR.
ROBERT F. GREBB.
BY
ATTORNEY.

Patented Nov. 23, 1948

2,454,694

UNITED STATES PATENT OFFICE 2,454,694

AUTOMATIC FLUID CONTROLLED TRANSMISSION

Robert F. Grebb, Boise, Idaho

Application July 9, 1945, Serial No. 603,921

2 Claims. (Cl. 74—293)

This invention relates to an automatic power transmission and has for its principal object the provision of a simple and highly efficient speed change mechanism which will have no shifting parts and in which the gear ratio or torque delivered will be automatically decreased as the speed increases.

Another object of the invention is to provide a device of this character in which the gears will remain in mesh at all times so as to reduce tooth wear and damage.

A further object of the invention is to so construct the device that the gear ratio will be automatically controlled through a fluid medium without the use of mechanical shifting mechanisms.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a longitudinal section through the improved automatic power transmission; and Figs. 2 to 5, inclusive, are cross sections through the automatic shifting device, taken on the lines of their respective numerals, in Fig. 1.

In Fig. 1, a drive shaft through which the power is furnished to the transmission is indicated at 10 and the driven shaft receiving its power from the transmission is indicated at 11. The shafts 10 and 11 are journalled in suitable bearings 12 in an outer gear case 13 of any desired design. The extremity of the driven shaft 11 is rotatably journalled in the extremity of the drive shaft 10 so that it may rotate relative thereto.

The drive shaft 10 terminates in a drive gear 14 which is in constant mesh with a first set of planet gears 15 supported from and journalled on a planet gear spider 16. The spider 16 is in turn journalled on the driven shaft 10 and is provided with a hub 17, extending therealong, which carries a sun gear 18.

The sun gear 18 is in constant mesh with a second set of planet gears 19 which are supported thereabout upon a second planet gear spider 20, the hub of which, indicated at 21, extends along and is journalled on the driven shaft 11. A second sun gear 22 is keyed on the hub 21 and is in constant mesh with a third set of planet gears 23. The third set of planet gears are supported from the third planet gear spider 24, the hub of which is keyed to the driven shaft 11.

A rotatable drum 25 concentrically surrounds all of the gears. This drum carries a first ring gear 26 meshing with the first set of planet gears 15, a second ring gear 27 meshing with the second set of planet gears 19 and a third ring gear 28 meshing with the third set of planet gears 23. The ring gears 26, 27 and 28 are secured to and rotate with the drum 25.

A partition disc 29 extends inwardly from the drum 25 at each side of the second set of planet gears to form a fluid chamber thereabout. In use, the chamber is partially filled with oil so that, when at rest, the lowermost portion of the ring gear 27 and the lowermost planet gear 19 are submerged. When the drum is rotating, however, the supply of oil spreads in a ring around the entire interior between the partition discs 29 so that the entire ring gear 27 and the intermeshing planet gears 19 are emersed in the ring of oil. The partition discs prevent the oil from overflowing to the planet gear sets 15 and 23.

The spider 20 supports an annular ring plate 30 and a similar ring plate 31 is supported at the opposite side of the planet gears 19 upon the shafts thereof. The ring plates are closely spaced to two annular side plates 32 at each side of the ring gear 27. The plates 30, 31 and 32 form an enclosure about the ring gear and tend to retain the oil thereabout. The plates 30 and 31 also act to support separating blocks 33 between the planet gears 19 to fill the spaces therebetween so as to confine the oil to the cavities around the gear teeth. The blocks 33 may be secured to the plates 30 and 31 in any desired manner such as by means of cap screws 34.

The first and third planet gear sets 15 and 24 are simply for the purposes of spaced reduction and form no part of the automatic portion of the transmission.

Operation

As illustrated, if the drum 25 were prevented from rotating, the drive gear 14 would rotate the planet gears 15 around the inside of the ring gear 26 causing the spider 16 to rotate the sun gear 18 at reduced speed. The sun gear 18 in turn would rotate the planet gears 19 around the inside of the ring gear 27 causing the spider 20 to rotate the second sun gear 22 at further reduced speed. The sun gear 22 in turn would rotate the planet gears 23 about the inside of the ring gear 28 causing the spider 24 to rotate the driven shaft 11 at still further reduced speed. Since the drum 25 is free to rotate, however, the reactive force of the planet gear sets will rotate the drum rearwardly at the slowest impressed speed so as to still further reduce the speed of the driven shaft 11. In fact, if the drive shaft is rotating slowly and the load on the driven shaft is sufficiently heavy, the driven shaft will remain stationary.

The intermeshing of the teeth of the second planet gear set 19, however, is resisted by the trapped oil. The blocks 33 fit relatively close to the teeth of the planet gears 19, the sun gear 18, and the ring gear 27. Therefore, the teeth of these gears act in the nature of a gear pump to force the oil along the passages between the block 33 and the gears. For instance, let us assume that the drum and ring gear 27 are being forced in a counter-clockwise direction. This rotates the planet gears 19 both collectively and individually around the sun gear 18 in a counter-clockwise direction. This causes the teeth of the ring gear 27 and the teeth on the trailing sides of the planet gears 19 to pump the oil into the notches where the teeth of these gears intermesh. This oil must return past the advancing teeth through the narrow passages.

This, of course, creates back pressure upon the teeth in a manner similar to the restricting of the discharge from any gear pump and resists relative rotation between the gears 19 and the ring gear 27. This resistance reacts against the sun gear so that the rearward movement of the drum will be gradually reduced until a point is reached when the drum will rotate with the sun gear 18 and deliver the full speed of the latter to the second sun gear 22. This full speed will be only attained with light loads on the driven shaft. Heavier loads will result in "slippage" or relative movement between the gears 19 and the drum 25, depending upon the torque required in the driven shaft.

As soon as the speed of the shaft 10 is decreased, the quantity of oil being pumped and the pumping load will decrease allowing the planet gears of the set 19 to rotate the drum rearwardly to allow the driven shaft to slow down and eventually come to rest.

It can be readily seen from the above that an automatically changeable gear ratio is provided from the free running stage through a direct connected stage to an overdrive or multiplied speed stage.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An automatic power transmission comprising: a drive shaft; a drive gear on said drive shaft; a first set of planet gears surrounding and in mesh with said drive gear; a first planet gear spider supporting said first planet gears; a hub on said spider; a sun gear mounted on said hub; a second set of planet gears surrounding and in mesh with said sun gear; a second planet gear spider supporting said second set of planet gears; a driven shaft operatively connected with said second spider; a drum surrounding all of said gears; a first ring gear positioned in and carried by said drum in mesh with the first set of said planet gears; a second ring gear fixed in said drum in mesh with said second set of planet gears; and an annular side plate secured to and extending inwardly from said drum at each side of said second set of planet gears; an annular rotatable ring plate positioned inside of each side plate and forming a continuation thereof to form, in combination with said side plates, a fluid chamber to retain fluid about said second planet gears and said second ring gear.

2. An automatic power transmission comprising: a drive shaft; a drive gear on said drive shaft; a first set of planet gears surrounding and in mesh with said drive gear; a first planet gear spider supporting said first planet gears; a hub on said spider; a sun gear mounted on said hub; a second set of planet gears surrounding and in mesh with said sun gear; a second planet gear spider supporting said second set of planet gears; a driven shaft operatively connected with said second spider; a drum surrounding all of said gears; a first ring gear positioned in and carried by said drum in mesh with the first set of said planet gears; a second ring gear fixed in said drum in mesh with said second set of planet gears; an annular side plate secured to and extending inwardly from said drum at each side of said second set of planet gears; an annular rotatable ring plate positioned inside of each side plate and forming a continuation thereof to form, in combination with said side plates, a fluid chamber to retain fluid about said second planet gears and said second ring gear; separating blocks secured to and extending between said ring plates and between the gears of said second set of planet gears, said blocks conforming in shape to the curvature of the planet and ring gears being supported by said second planet gear spider.

ROBERT F. GREBB.

REFERENCES CITED

The following references are of record in the file of this patent:

UNITED STATES PATENTS

| Number | Name | Date |
|--------|------|------|
| 1,993,988 | Barrett | Mar. 12, 1935 |
| 2,391,333 | Nardone | Dec. 18, 1945 |
| 2,404,623 | Dodge | July 23, 1946 |

FOREIGN PATENTS

| Number | Country | Date |
|--------|---------|------|
| 579,600 | Germany | June 29, 1933 |